United States Patent [11] 3,627,634

| [72] | Inventors | Ralph W. Guenther;<br>Ned P. Hansen, both of San Jose, Calif. |
|---|---|---|
| [21] | Appl. No. | 779,000 |
| [22] | Filed | Nov. 26, 1968 |
| [45] | Patented | Dec. 14, 1971 |
| [73] | Assignee | General Electric Company |

[54] NUCLEAR REACTOR CORE CLAMPING SYSTEM
    5 Claims, 11 Drawing Figs.
[52] U.S. Cl. .................................................. 176/58,
    176/85, 176/87.1, 176/33
[51] Int. Cl. .............................................. G21c 19/00
[50] Field of Search .......................................... 176/87, 85,
    58

[56]                 References Cited
              UNITED STATES PATENTS
3,206,374  9/1965  Lemesle et al. ..............  176/85
3,215,608  11/1965  Guenther .....................  176/85 X Primary Examiner—Reuben Epstein
Attorneys—Ivor J. James, Jr., Samuel E. Turner, John R. Duncan, Frank L. Neuhauser, Oscar B. Waddell and Melvin M. Goldenberg ABSTRACT: A system for tightly clamping together the core components of a nuclear reactor is disclosed. A typical core is made up of a plurality of subassemblies each contained in an elongated shroud having a hexagonal cross section. Each of the outer ring of subassemblies includes ram means adapted to be pushed outwardly against a fixed ring which surrounds the core. This causes this outer ring, or edge plate of subassemblies to press inwardly on the core, tightly clamping the overall assembly together, preventing shifting during reactor operation and the resulting undesirable reactivity changes.

INVENTORS:
RALPH W. GUENTHER
NED P. HANSEN

ATTORNEY:

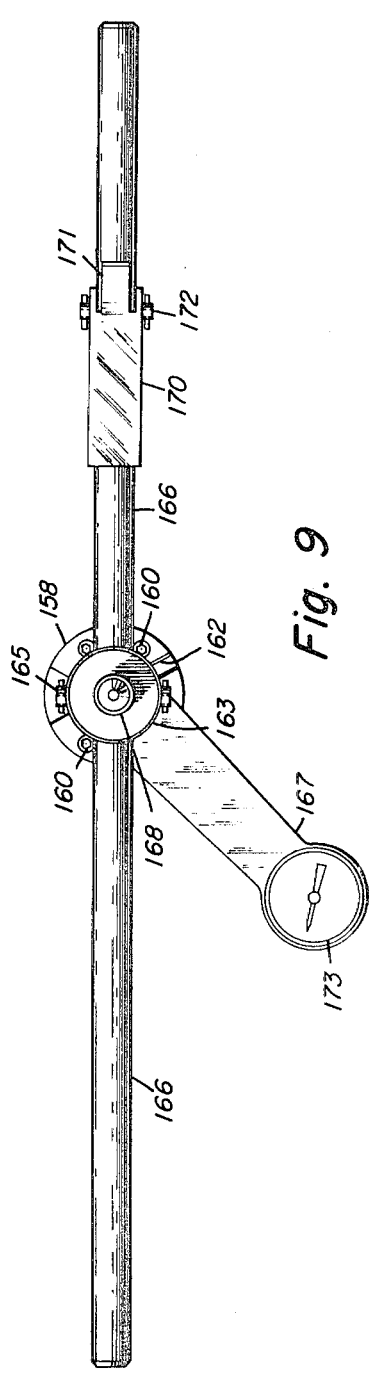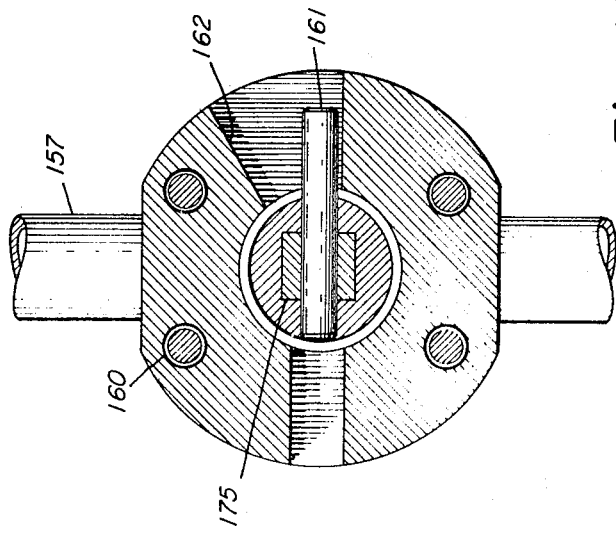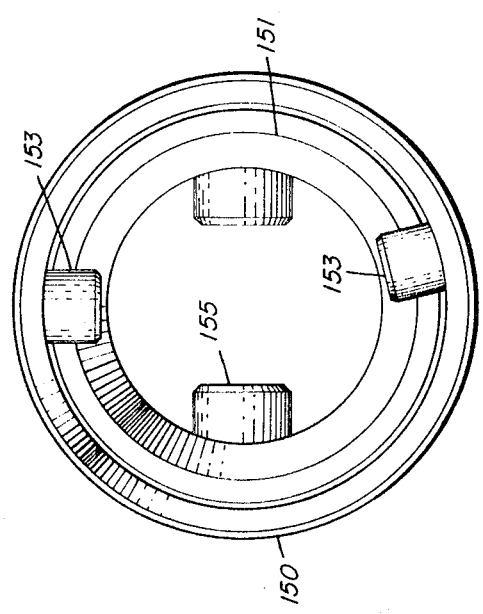

NUCLEAR REACTOR CORE CLAMPING SYSTEM

BACKGROUND OF THE INVENTION

Nuclear chain fission reactions and the reactors in which they take place are now well known. A typical reactor includes a chain reacting assembly or core made up of nuclear fuel material contained in fuel elements. The fuel material is generally encased in corrosion resistant heat conductive containers or cladding. The reactor core, made up of a plurality of these fuel elements in spaced relationship, plus control rods or blades, in-core instrumentation, etc., is enclosed in a container or shroud through which the reactor coolant flows. As the coolant passes between the spaced fuel elements, it is heated by thermal energy released in the fuel during the fission reaction. The heated coolant then leaves the reactor, the heat energy is used to perform useful work such as by driving a turbine-generator set to produce electrical power, and the now-cooled coolant is recycled back to the reactor.

In typical commercial power reactors, the coolant is water which may be heated under pressure or evaporated in the core. Recently, reactors have been designed using steam as a coolant. In power plants using reactors of this type, saturated steam enters the reactor and is superheated as it passes through the core. The superheated steam leaves the reactor, is desuperheated and condensed while performing useful work, and is re-evaporated and recycled back to the reactor. This system is preferred for many applications, since steam at high temperature and pressure is often more useful than the lower temperature steam produced by conventional pressurized water and boiling water reactors. For example, electrical power-generating turbines are generally more efficient and economical when driven by superheated rather than saturated steam.

Prior steam-cooled reactor designs have been largely a compromise among various conflicting variables. For example, it is desirable that control rods or blades enter the core from the top, so that gravity will aid entry. However, it is also desirable that the steam coolant channels be designed for upward flow, so that when the reactor core is shut down and flooded with water, the water can be circulated using, in part, natural convection (upward) circulation. Upward flow of coolant past the top-entry control rods, however, exerts hydraulic forces on the rods which may more than overcome gravitational forces.

In many prior steam cooled reactors it is necessary to direct a portion of the incoming saturated steam through nonfueled elements, such as control rods and instrumentation to cool them, instead of passing through the fuel-containing core. This is disadvantageous, since the reactor outlet steam temperature is diluted as a result of mixing core outlet steam with steam which has bypassed the core to cool the nonfueled elements.

In a steam-cooled fast-neutron reactor, the core may contain a wide variety of subassemblies, each contained in an individual shroud. The subassemblies are generally hexagonal in cross section and, when assembled together, form a generally right-cylindrical core. Typical different subassemblies contain fuel elements, control materials, moderators and reflectors. It is important that the overall core have a stable, fixed configuration during reactor operation. Unexpected movement or vibration of the various elements may cause unexpected reactivity changes. In extreme cases, such changes may cause local overheating due to local flux changes which could damage fuel rods and/or cause an emergency shutdown of the reactor.

Several systems have been proposed for claiming a reactor core tightly together. However, these prior art systems have several disadvantages. Generally, the clamping means is located outside the core and occupies valuable space and causes an increase in core containment size. Usually the core clamping pressure is not adjustable, being either on or off. In such a system, initial pressure may be excessive in order to assure adequate pressure after aging and wear in the system. Many systems are not readily accessible and hinder removal of core components for repair or replacement. Thus, there is a continuing need for improved systems for clamping core components together in a nuclear reactor.

SUMMARY OF THE INVENTION

It is, therefore, an object of this invention to provide a nuclear reactor core clamping system overcoming the above-noted problems.

Another object of this invention is to provide a core-clamping system capable of exerting an adjustable clamping force.

Still another object of this invention is to provide a core-clamping system substantially entirely contained within the core.

A further object of this invention is to provide a readily accessible, easily replaceable core-clamping system.

The above objects, and others, are accomplished in accordance with this invention, basically, by providing at least one outwardly extending ram and a latchable torque rod within each of the outer ring of core subassemblies adapted to cooperate with at least one fixed clamp ring which surrounds the core.

While this system, as a whole, is especially useful with a reactor of the fast-neutron steam-cooled type, the system and many of the components have utility in other types of reactors, especially those cooled by other gases.

BRIEF DESCRIPTION OF THE DRAWINGS

Details of a preferred embodiment of the invention will be further understood upon reference to the drawings, wherein

FIG. 9 is a plan view of the clamp actuating tool;

FIG. 10 is a horizontal section through the clamp actuating tool taken on line 10—10 in FIG. 8; and FIG. 11 is an end view of the clamp engagement portion of the clamp actuating tool.

DETAILED DESCRIPTION OF THE INVENTION

Figure 1:
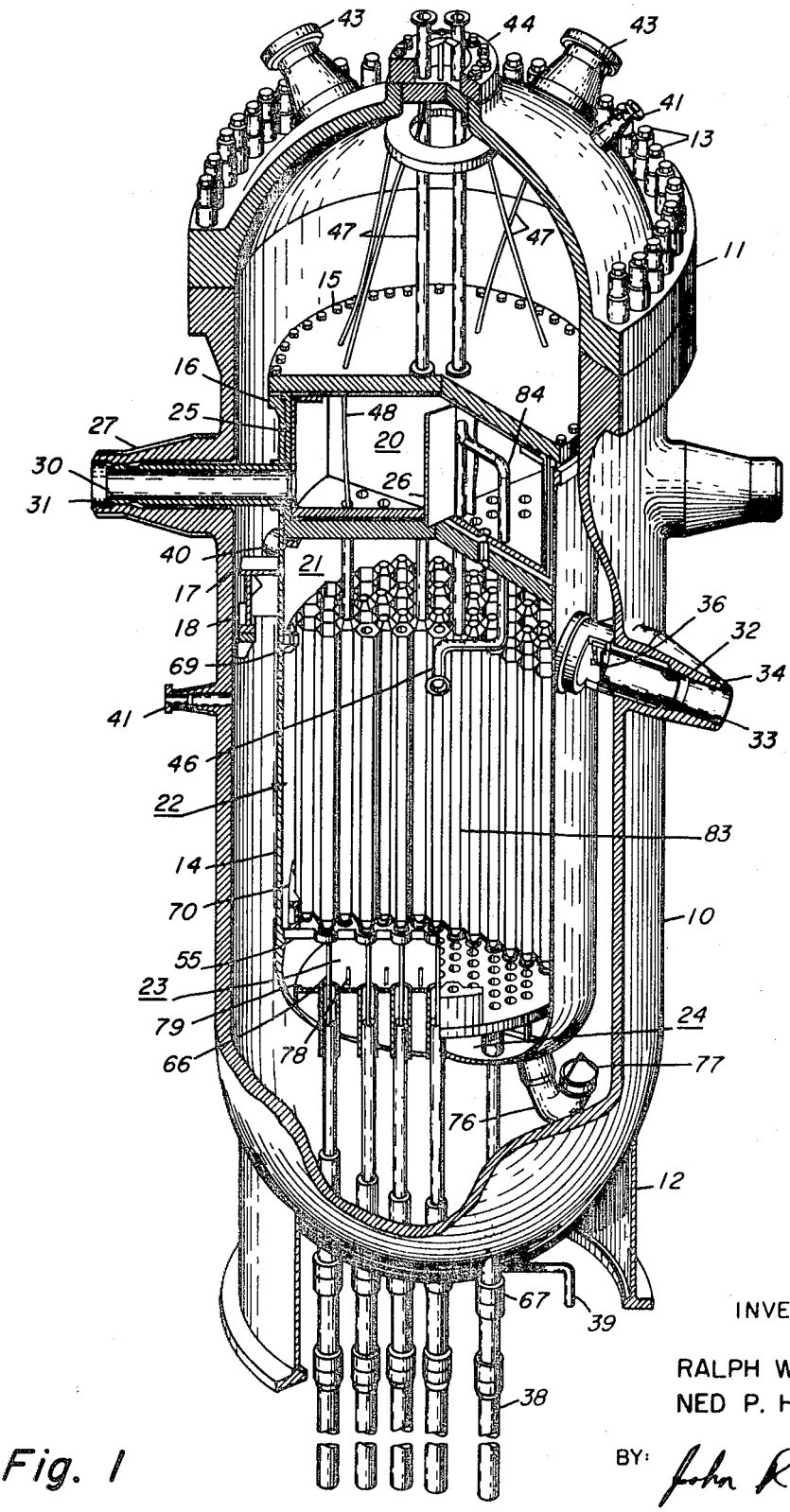
FIG. 1 is a perspective view, partly cut away and somewhat simplified for clarity, of the steam-cooled nuclear reactor of this invention.

Referring now to FIG. 1, there is seen a simplified perspective view of a nuclear reactor including an open-topped pressure vessel 10 closed by a head 11. Pressure vessel 10 is supported by a skirt 12 for mounting on a suitable foundation (not shown). Head 11 is secured to pressure vessel 10 by a plurality of bolts 13.

Within pressure vessel 10 is mounted an open-topped shroud 14 closed by a closure flange 15 seated on shoulder 16. Shroud 14 is supported by means of flexible box-shaped supports 17 resting on a inwardly projecting support pad members 18 on the inner wall of pressure vessel 10. Support 17 is rigidly fastened to support pad 18 in a manner permitting a slight amount of radial flexing in support 17 to compensate for differing thermal expansion of shroud 14 and pressure vessel 10 during reactor heat-up and cooldown.

Within shroud 14 are contained a superheated steam outlet plenum 20, a saturated steam inlet plenum 21, a core and blanket space 22, a lower steam plenum 23 and flooding water inlet plenum 24.

Outlet plenum 20 is closed at the top by closure flange 15 and at the sides and bottom by exhaust divider and holddown 25 which includes vertical dividing plates 26 which divide outlet plenum 20 into a plurality of pie-shaped segments. Superheated steam leaves each of the plenum segments through a superheated steam outlet 27. Typically, there may be six plenum segments and six outlets. Each of outlets 27 consists of an inner sleeve 30 secured to shroud 14 and in slidable sealing engagements with an outer sleeve 31. This permits the two sleeves to slide with respect to each other to compensate for differential thermal expansion.

Saturated steam enters inlet plenum 21 through a similar arrangement of slidable inner sleeve 32 secured to shroud 14 within an outer sleeve 33, the combination of which makes up a saturated steam inlet 34. Typically, three such inlets may be arranged to deliver saturated steam to inlet plenum 21. A check valve 36 is located in each inner sleeve 32 to prevent loss of steam through inlet 34 should the saturated steam supply fail for any reason.

A plurality of control rod drives 38 penetrate the bottom of pressure vessel 10 and shroud 14. Only a few of the many control rod drives which would be used in a typical reactor are shown in FIG. 1, for clarity.

The space between the inner wall of pressure vessel 10 and shroud 14 is kept substantially filled with water during reactor operation. This provides neutron shielding and a convenient source of water to flood the core when the reactor is shut down. Water is admitted to this space through a shield and flood water inlet 40. Openings 41 are provided for instruments for monitoring and controlling the water level within pressure vessel 10. A cleanup line 39 is provided at the bottom of pressure vessel 10 to drain water therefrom, when desired.

Instrumentation outlets 43 and seal plug 44 are provided for the admission of steam sample lines, thermocouple connections, etc., into pressure vessel 10.

Figure 2:
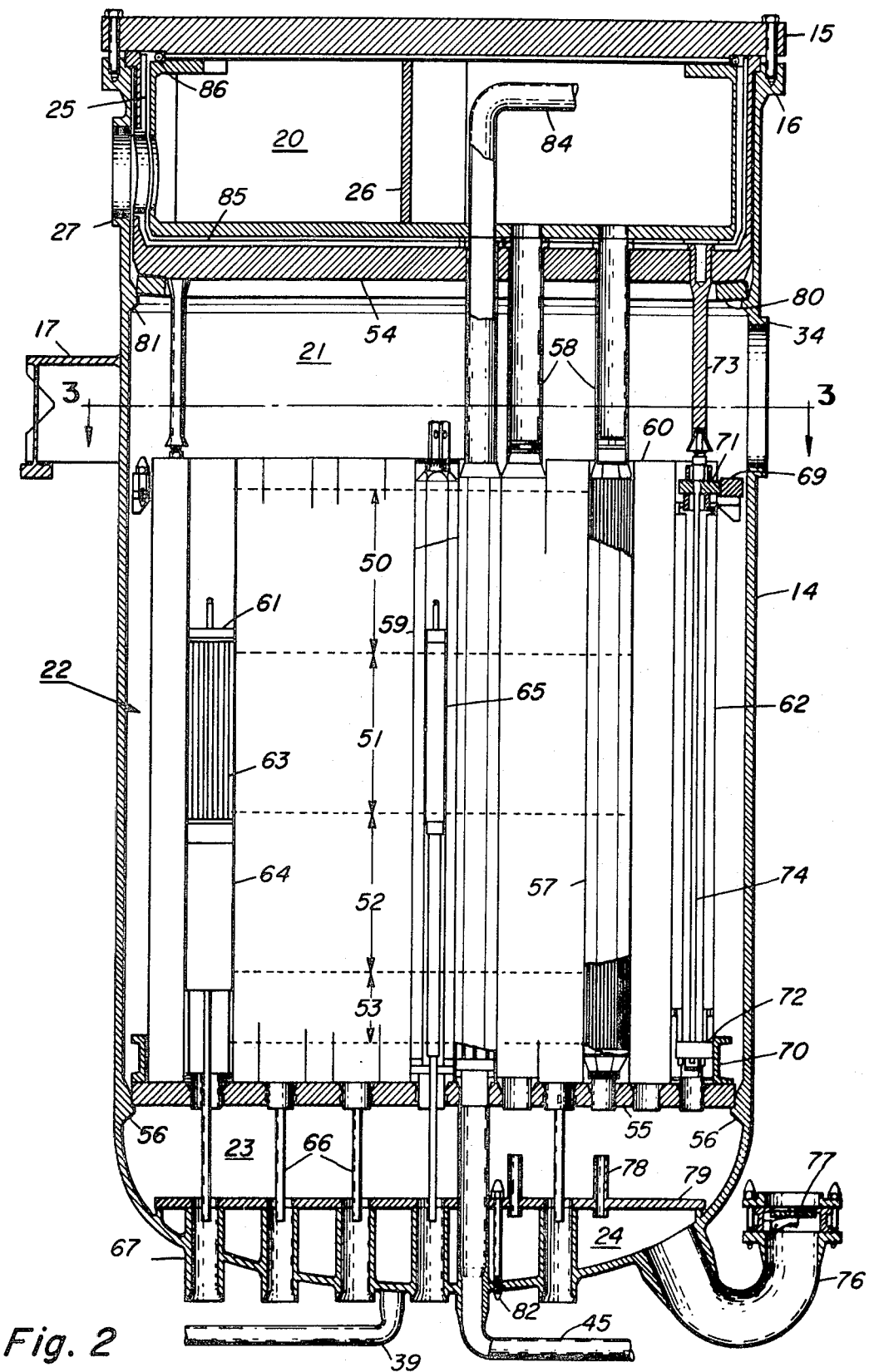
FIG. 2 is a vertical section through the core shroud containing the reactor internal components.

If desired, one test fuel assembly 83 may be provided with an individual saturated steam inlet line 45 (as seen in FIG. 2) and superheated steam outlet line 46 so that special fuel assemblies may be tested during reactor operation.

A plurality of instrumentation leads 47 may enter pressure vessel 10 through instrumentation outlets 43 and seal plug 44. As is further indicated below, this reactor is unusually well adapted to permit individual sampling of steam output from each fuel assembly. A typical steam sampling line is shown at 48.

Figure 3:
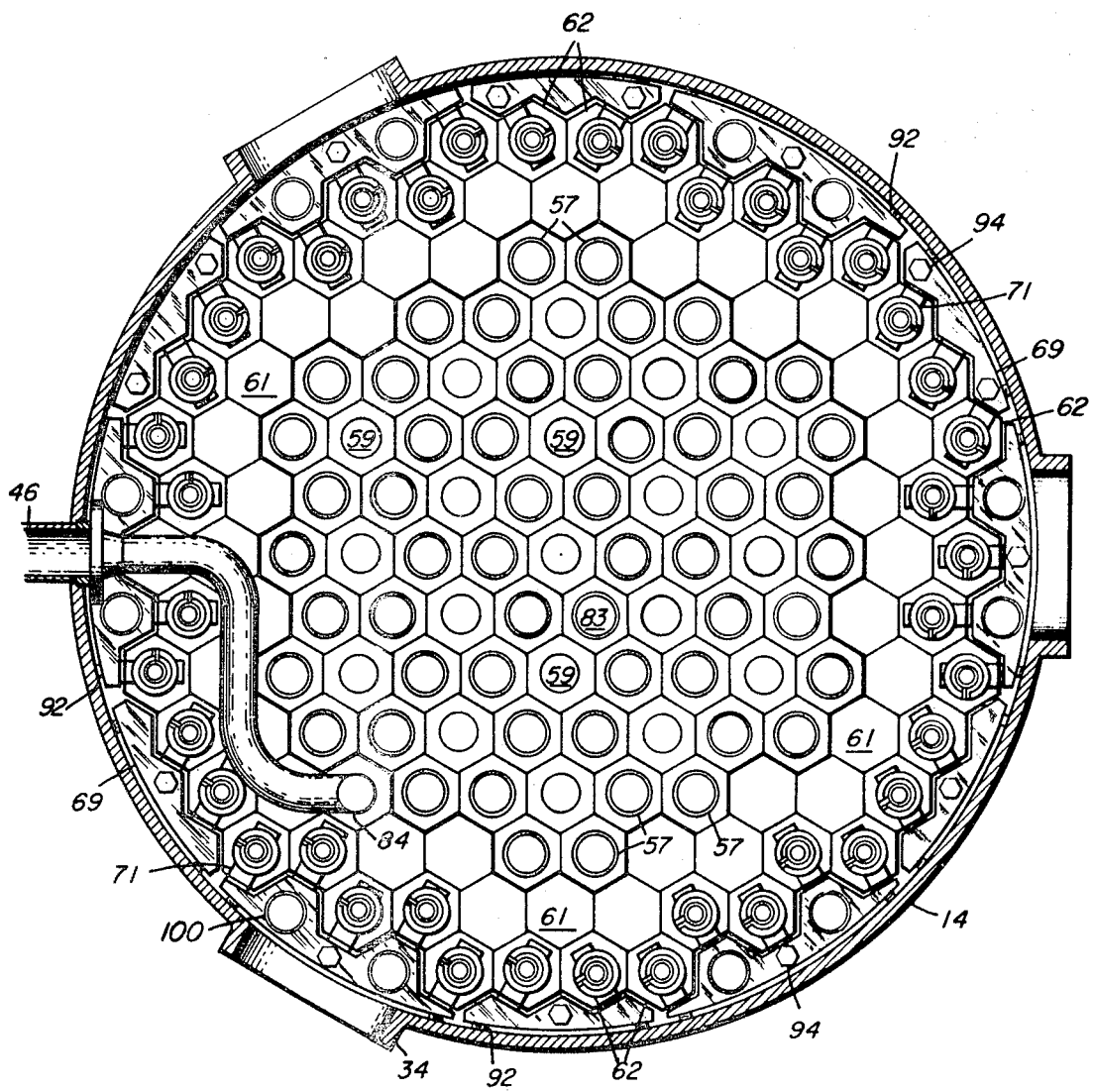
FIG. 3 is a horizontal section through the core shroud, taken on line 3—3 in FIG. 2.

Details of the arrangement of components within shroud 14 may best be understood by considering FIGS. 1 and 2 together. FIG. 2 shows a vertical section through shroud 14, somewhat simplified for clarity. While the core and blanket region contains many fuel subassemblies, control rods, reflector assemblies, etc., as seen in FIG. 3, only one of each is detailed in FIG. 2.

The overall reactor core 22 is divided axially into four sections, an upper blanket 50, an active fuel region 51, a lower blanket 52 and a gas plenum region 53. These sections are illustratively divided by dashed lines in FIG. 2. Radially, the overall reactor core 22 is divided into two sections, as best seen in FIG. 3. The central section consists of fuel subassemblies 57 and control assemblies 59 while the outer ring-shaped section consists of reflector assemblies 60, reflector clamp assemblies 62 and reflector control assemblies 61.

All of the subassemblies which make up overall core 22, except the fuel subassemblies, are supported at this lower end by core plate 55, which is in turn supported by an inwardly projecting shoulder 56 on shroud 14. As is further described below, these nonfuel assemblies are primarily made up of multirod subassemblies which permit saturated steam to flow downwardly therethrough from inlet plenum 21 to lower steam plenum 23.

Each of the fuel assemblies 57 is secured to an orifice seal assembly 58 which depends from seal plate 54. The fuel assemblies are thus held out of weight-bearing contact with core plate 55, although a cylindrical extension on each fuel assembly passes through holes in core plate 55 in sliding contact therewith. The spacing between the fuel assemblies and core plate 55 allows for thermal expansion of the fuel. These orifice seals 58 and the fuel assembly support system are described in detail and claimed in copending U.S. Pat. application Ser. No. 779,135 filed concurrently herewith.

Reflector control assemblies 61 include an upper control section 63 and a lower reflector section 64. Control section 63 includes a plurality of rods of a neutron-absorbing or "poison" material, such as boron carbide. Reflector section 64 includes a plurality of rods of a neutron reflecting material, such as nickel. In FIG. 2, the reflector control assembly 61 is shown in the maximum control position, with the neutron-absorbing section adjacent fuel region 51. As assembly 61 is moved upwardly, control decreases as the neutron-absorber is replaced by neutron reflector. Saturated steam passes downwardly through assembly 61, past the neutron absorbing and reflecting elements. This steam tends to both cool the assembly and aid gravity in moving the control section into the maximum control position.

Reflector assemblies 60 each consist of a plurality of spaced rods comprising a neutron-reflecting material such as nickel with a hexagonal shroud.

Control assemblies 59 each include a plurality of spaced rods each containing neutron-moderating material such as beryllium oxide surrounding a cylindrical core within which a unit 65 made up of several neutron-absorbing rods is movable. Unit 65 is shown in FIG. 2 in the maximum control location. To increase the reactivity within fuel region 51, unit 65 is raised. Saturated steam coolant passes downwardly through each control assembly 59, cooling the assembly and aiding gravity in moving unit 65 into the fuel region in the event of an emergency.

All of the control assemblies 59 and reflector control assemblies 61 are moved by conventional drive means (not shown) which connect to drive rods 66 through thimbles 67.

Around the outside of core 22 is located a ring of reflector clamp assemblies 62. Around the upper and lower ends of core 22 are located an upper edge plate 69 and a lower edge plate 70, respectively. These plates conform to the irregular cylindrical shape of the core. Within each of the reflector clamp assemblies 62 is located a plurality of spaced rods made up of a neutron-reflecting material, such as nickel and a pair of rams 71 and 72, adapted to be moved outwardly against upper and lower edge plates 69 and 70, respectively. As these rams move outwardly, the clamp assembly shrouds press inwardly, clamping core 22 tightly together. This prevents core movement during reactor operation which would result in undesired reactivity changes. A clamp holddown rod 73 engages the upper end of a torque rod 74 in each reflector clamp assembly 62.

During reactor construction, or after refueling, etc., the core is first assembled as shown. Then seal ring 80 is placed within shroud 14 in engagement with an annular, inwardly projecting ridge 82. When seal plate 54 is lowered into place, it engages and deflects the inner edge of seal ring 80. This results in an excellent gas and liquid seal between the wall of shroud 14 and seal plate 54. Orifice seals 58 are lowered into place and the fuel assemblies 57 are raised out of weight-bearing contact with core plate 55 and locked to orifice seals 58.

Clamp-operating tools are brought into engagement with ram drive rods 74 and are operated to drive rams 71 and 72 outwardly to tightly clamp core 22 together.

Exhaust divider and holddown 25 is lowered into place. This holds orifice seals 58 and holddown rods 73 tightly in place.

While most of the orifice seals 58 align with openings in holddown 25 to deliver superheated steam thereinto, one or more may align with an individual test loop crossover pipe 84. Thus, an individual test fuel assembly may be provided with independent saturated steam inlet 45 and superheated steam crossover pipe 84. While in a strictly power reactor this test loop may be eliminated, this reactor design is exceptionally well adapted to having such a test facility included.

Thermal insulation 85 may be provided to decrease heat transfer from superheated steam outlet plenum 20 to saturated steam inlet plenum 21, if desired.

Finally, closure flange 15 is installed. A plurality of rollers 86 are provided between closure flange 15 and exhaust divider and holddown 25 to permit pressure contact while allowing for differential thermal expansion.

As described above, when internal pressure within shroud 14 drops below a preset value, as during an emergency or during reactor shutdown, the core is automatically flooded with water. One of several flooding valve assemblies 76 is shown in FIGS. 1 and 2. When shroud internal pressure drops, check valve 77 opens, admitting water into flooding water inlet plenum 24. A plurality of flooding nozzles 78 are arranged on closure plate 79, in alignment with the fuel assemblies in core 22. Plate 79 is held in place by a plurality of bolts 81. Slight leakage through the shroud into plenum 24 is immaterial, since both spaces are water filled. Nozzles 78 immediately direct flooding water into the fuel assemblies to immediately begin cooling them. Since the flow of steam coolant during reactor operation is upward through the fuel assemblies, it is not necessary to reverse coolant flow during flooding. Also, flow of water through the fuel assemblies in the upward direction is aided by natural convection.

The overall reactor structure and internal components are described in further detail in copending U.S. Pat. application, Ser. No. 778,998 filed concurrently herewith.

The layout of the various assemblies within the overall core is shown in FIG. 3, which is a horizontal section taken through shroud 14.

This typical overall core 22 includes 54 fuel assemblies, 53 of which are regular fuel assemblies 57 and one of which is a test fuel assembly 83. Of course, if desired in a strictly power plant reactor, all of the fuel assemblies could be conventional and the test loop could be eliminated. Conversely, if desired, additional test loops could be easily added to this reactor.

A heavy black line schematically indicates the border between the fuel region and the radial reflector region. Within the fuel region, in addition to the above-mentioned fuel assemblies, are included 19 control assemblies 59 which consist of neutron-absorbing control elements with neutron-moderating followers. The reflector region includes 18 reflector control assemblies 61, 18 stationary reflector assemblies 60 and 42 reflector clamp assemblies 62.

The reflector clamp assemblies 62 include movable upper rams 71 which bear against an interrupted upper edge plate 69 secured to the inner wall of shroud 14 by a plurality of fixed bolts 94 and adjustable bolts 97. Similar cooperating lower rams 72 and lower edge plate 70 are located at the lower end of reflector clamp assemblies 62, as best seen in FIG. 2. As rams 71 and 72 press outwardly, the clamp assembly shrouds tightly press the core together.

A plurality of down-flow tubes 100 pass through edge plates 60 and 70 to aid in conducting saturated steam from saturated steam inlet plenum 21 to lower steam plenum 23. These tubes are sized so that part of the saturated steam passes downwardly through the nonfuel containing core assemblies (e.g., control and reflector assemblies) and part through down-flow tubes 93.

Each of the fuel assemblies 57 includes an individual orifice seal 58 which conducts superheated steam upwardly from the individual fuel assembly to outlet plenum 20, as seen in FIGS. 2 and 3.

Figure 4:
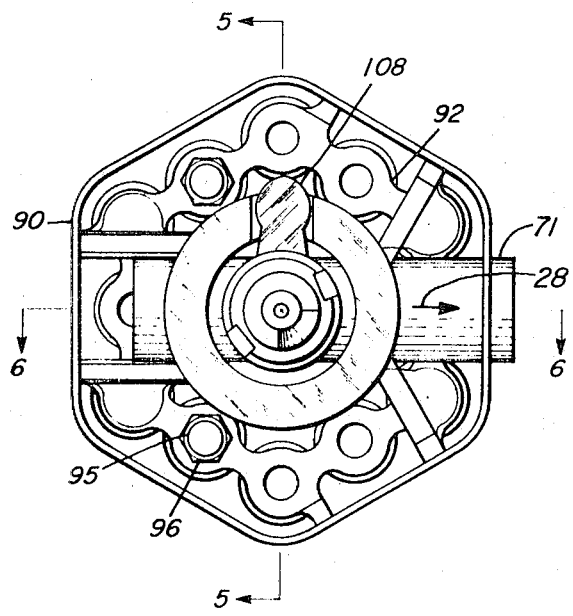
FIG. 4 is a plan view of a typical clamp assembly.
Figure 7:
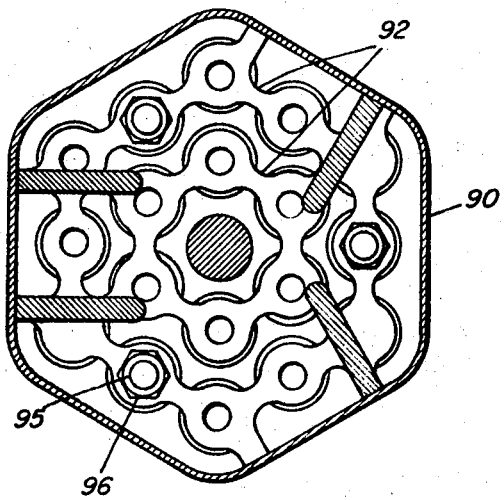
FIG. 7 is a horizontal section through the clamp assembly taken on line 7—7 in FIG. 5.

A typical reflector clamp assembly 62 is shown in further detail in FIGS. 4-7. The assembly is contained within a generally hexagonal tubular shroud 90. A plurality (e.g., 18) of reflector rods 91 extending through the upper blanket 50, fuel region 51 and lower blanket 52 of core 22 (as seen in FIG. 2), are rigidly held between upper end plate 92 and lower end plate 93. These end plates 92 and 93, as seen in FIGS. 4 and 7, are cut away to allow coolant to pass through the reflector rod assembly. Several of the reflector rods 91 have threaded end portions 95 extending through end plates 92 and 93 and secured thereto by nuts 96. These serve as tie rods, helping to hold end plates 92 and 93 in the desired spaced relationship.

Upper end plate 92 is secured to support webs 98, which also support upper stub tube 99. Similarly, lower end plate is secured to support webs 101 which also help support lower stub tube 102. Lower stub tube 102 is in addition supported by a plurality of downwardly extending support bars 104.

A torque rod 74 extends downwardly through the center of the reflector rod assembly. Upper and lower splined portions 106 and 107 on torque rod 74 engage upper foot 108 and lower foot 109, respectively. Feet 108 and 109 are located within stub tubes 99 and 102 and project outwardly through vertical slots in the stub tubes.

An upper ram 71 and a lower ram 72 are slidably positioned in transverse openings through upper and lower stub tubes 99 and 102, respectively. Torque rod 74 passes through openings 111 and 112 in rams 71 and 72. Torque rod 74 is held in position by a lower ring 114 pinned by pin 115 to the lower end of the torque rod and at the top by an upper ring 116 which abuts a shoulder formed by upper spline 106.

In use, the reflector clamp assembly is inserted into the core with a nozzle 120 slidably inserted into a hold in core plate 55. Nozzle 120 is secured to shroud 90 by a transition casting 121 and a retaining collar 122. Collar 122 is secured to transition casting 121 with a flange 123 on nozzle 120 slidably fitting therebetween. This sliding fit permits shroud 90 to move slightly in a transverse direction with respect to nozzle 120 during the core-clamping operation.

After all core components have been installed, a clamp-actuating tool such as that shown in FIGS. 8-11 is brought into engagement with circumferential groove 125 in the upper end of the sleeve on foot 108. Foot 108 is lifted so that spline 106 is disengaged. Then the actuating tool engages notch 126 in the upper end of torque rod 74. Torque rod is twisted until the proper torque has been introduced, then spline 106 is reengaged. The actuating tool is then removed. Torque in torque rod 74 causes feet 108 and 109 to press against the wall of the slots in stub tubes 99 and 102, respectively. Since torque rod 74 is relatively free, and stub tubes 99 and 102 are fixed, the force (indicated by arrow 28 in FIG. 4) tends to displace torque rod 74 transversely and together with it rams 71 and 72 are moved outwardly. Since the rams engage fixed upper and lower edge plates 69 and 70, the entire assembly in shroud 90 tends to move toward the center of core 22. Since there is a complete ring of these inwardly moving clamp assemblies around core 22, the entire core will be tightly clamped together. The torque in torque rod 74 can be easily adjusted to give any desired core clamping force, and may be increased at intervals to accommodate wear, etc., during years of reactor operation.

Details of a suitable clamp-actuating tool are shown in FIGS. 8-11.

Figure 5:
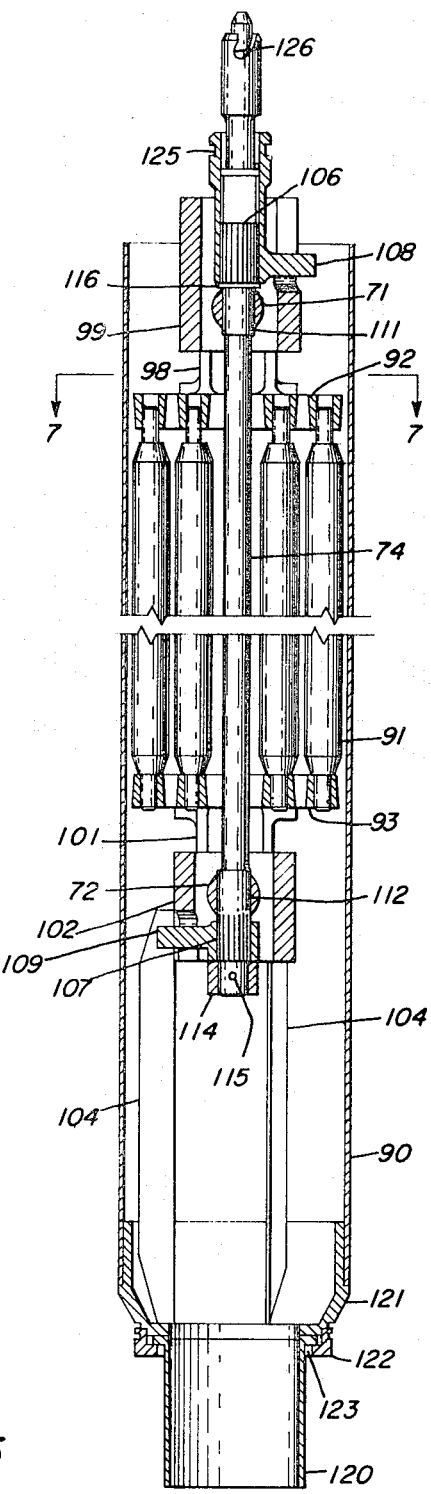
FIG. 5 is a vertical section through the clamp assembly taken on line 5—5 in FIG. 4.
Figure 6:
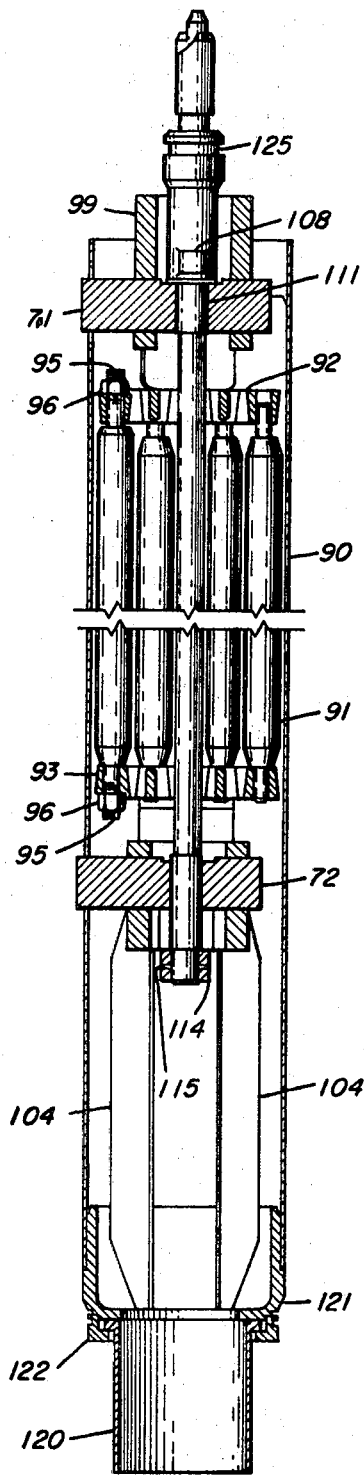
FIG. 6 is a vertical section through the clamp assembly taken on line 6—6 in FIG. 4.
Figure 8:
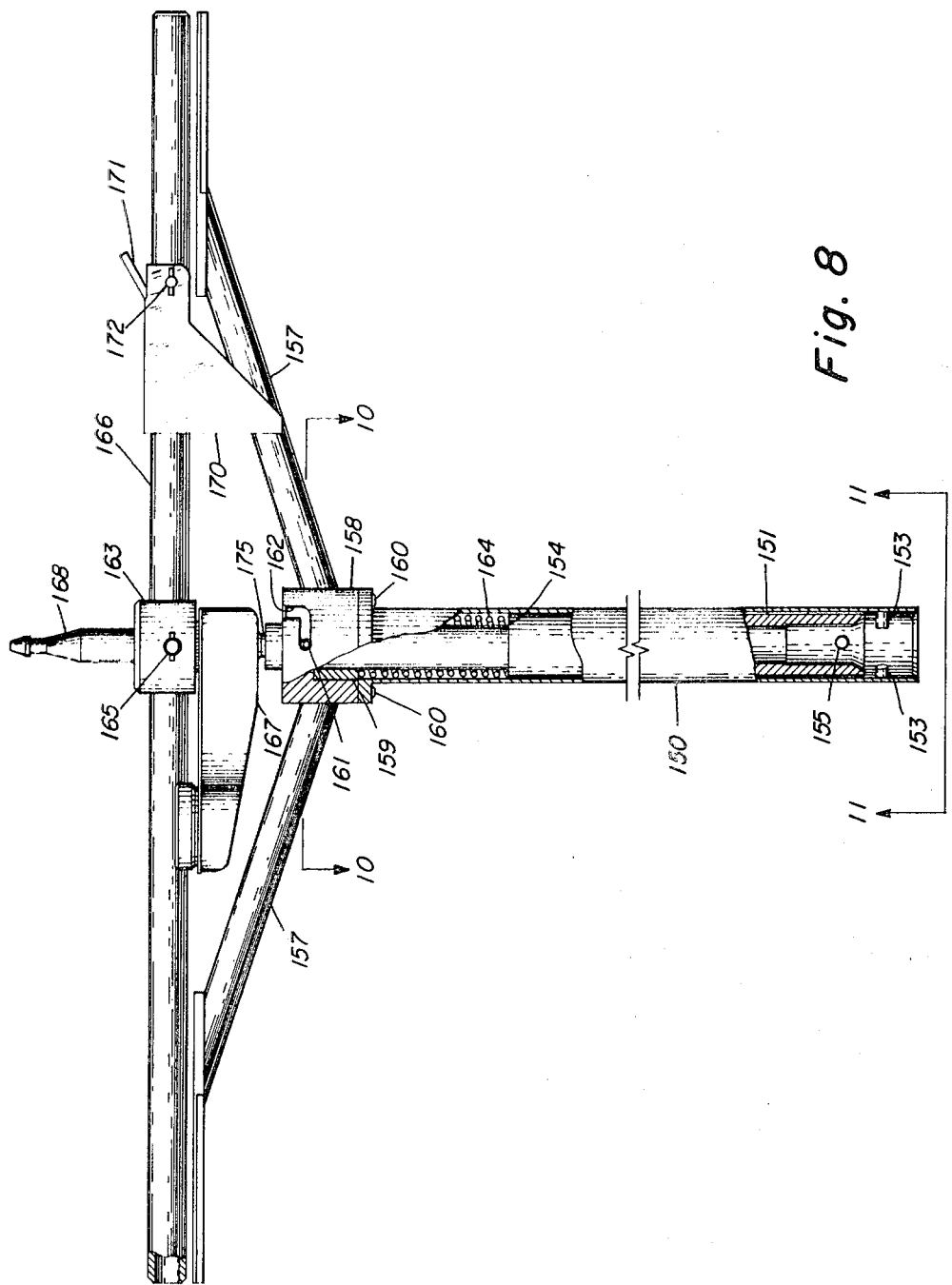
FIG. 8 is an elevation view of a typical clamp-actuating tool, partly cut away.

FIG. 8 shows the clamp actuating tool in elevation, partly cut away to show internal operating components. The tool includes an elongated outer sleeve 150 having bayonet lugs 153 at the lower end adapted to engage groove 125 on upper foot 108 of the reflector clamp assembly 62 (as seen in FIG. 5). Concentrically located within sleeve 150 is a torque tube 151 having lugs 155 at the lower end adapted to engage notches 126 in the upper end of torque rod 74 of reflector clamp assembly 62. Sleeve 150 is arranged so that it may be lowered until lugs 153 move into engagement with vertical slots connecting with groove 125, it is rotated slightly to move lugs 153 into groove 125, then it is lifted to raise foot 108 to disengage upper spline 106. Then torque tube 151 is rotated with lugs 155 in engagement with notches 126 until the desired torque is introduced into torque rod 74, whereupon spline 106 is reengaged to lock the torque in torque rod 74.

Sleeve 150 is lifted and rotated by means of a pair of turning bars 157 secured to sleeve 150 through a bearing sleeve 158. Bearing sleeve 158 is secured to outer sleeve 150 by a plurality of bolts 160. A ring of low-friction bearing material 159 is arranged between bearing sleeve 158 and torque tube 151 to permit rotation of the sleeve around the torque tube.

A pin 161 on torque tube 151 engages a slot 162 in bearing sleeve 158. This pin requires that sleeve 158 be rotated slightly before it can be lowered, then rotated back to lock sleeve 158 in the raised position. A spring 164 is provided along a thin portion of torque tube 151, bearing against a shoulder 165 on torque tube 151 and the lower surface of bearing sleeve 158. When the tool is in engagement with the torque rod, with its weight resting on pins 155 in groove 126, spring 164 exerts a vertical upward force on bearing 159 which serves to help raise torque tube 151 and bars 157. This aids the operator in raising the bars 157 to lift the assembly into the upper position.

Torque is introduced into torque rod 74 by rotating torque bar 166 which is connected to torque tube 151 through a conventional torque meter 167. A lifting lug 168 is provided above torque bar 166 so that the entire clamp actuating tool can be lifted by conventional reactor remote handling and conveying devices.

A latch assembly 170 is provided on one end of the torque bar 166 to latch turning bar 157 to torque bar so that both rotate together while torque tube 151 is being rotated. Latch 170 is disengaged by pressing down on flap 171 to rotate latch 170 about pivot 172. The latch is disengaged while turning bar 157 is being rotated to engage and disengage sleeve 150 and upper foot 108.

As best seen in FIG. 9, torque meter 167 has a dial 173 which may be observed by the tool operator. Thus, the operator may introduce the exact desired amount of torque into each reflector clamp assembly. The desired torque may vary, depending upon reactor conditions.

As seen in FIG. 10, the torque meter is connected to torque tube 151 by means of a square shaft 175 which extends down into torque tube 151. The shaft 175 is secured to tube 151 by pin 161. The upper end of the torque meter connecting shaft extends upwardly into housing 163 intermediate the ends of torque bar 166 and is secured thereto by pin 165. Thus, torque meter 167 may be simply removed for repair or replacement merely by withdrawing pins 161 and 165.

FIG. 11 shows a view of the lower end of the clamp actuating tool, looking upward. As is clear in this view, bayonet lugs 153 are slightly offset, to match equally offset vertical slots in upper foot 108. This offset assures that the clamp actuating tool will always be engaged in the same relative manner and will remain engaged for nearly one revolution of sleeve 150 relative to upper foot 108.

Thus, it can be seen that this clamp actuating tool is simple, effective and reliable. An operator can quickly and accurately introduce the desired torque into each of the reflector clamp assemblies around the reactor core. While other clamp-actuating tools may be used with the reflector clamp assemblies and core-clamping system of this invention, the above-described tool is preferred.

Although specific arrangements and proportions have been described in the above description of a preferred embodiment, other suitable arrangements and components may be used as indicated above, with similar results. While the clamping system of this invention is disclosed in the above description of a preferred embodiment in the context of a steam-cooled fast reactor, the system may be used in any suitable environment. Typically, the clamping system may be incorporated in any suitable thermal neutron reactor of the pressurized water or boiling water type or in a fast neutron reactor cooled by a liquid metal.

Other modifications and ramifications of the present invention will occur to those skilled in the art upon reading the present disclosure. These are intended to be included within the scope of this invention.

I claim:

1. In a nuclear reactor including an approximately vertical right cylindrical core comprising a plurality of parallel-elongated assemblies, at least some of which contain nuclear fuel material; the improvement wherein: an outer ring of clamp assemblies surrounds the core component assemblies, each clamp assembly including a shroud and at least one ram means projecting outwardly from said core through said shroud, at least one torque rod adapted to press said at least one ram outwardly away from said core when torque has been introduced into said torque rod, latch means to maintain a selected quantity of torque in said torque rod, and at least one fixed edge plate at least partially surrounding said core in contact with said ram, whereby as said ram is pressed outwardly against said fixed ring, said clamp assembly shroud is displaced inwardly, tightly clamping said core component assemblies together.

2. In a nuclear reactor according to claim 1 wherein two fixed edge plates surround said core adjacent the upper and lower ends thereof and each clamp assembly includes a pair of rams cooperating with said two rings, said torque rod adapted to press said rams against said rings while reaction forces press said clamp assembly and shroud inwardly.

3. In a nuclear reactor according to claim 1 wherein said latch means includes a splined sleeve in engagement with a spline on said torque rod, said splined sleeve including laterally extending means in contact with said clamp assembly preventing rotation of said torque rod to lock torque therein, said latch including means permitting said spline to be disengaged while torque is being introduced into said torque rod.

4. In a nuclear reactor according to claim 1 wherein a plurality of rods comprising a neutron-reflecting material are included in said shroud at least practically surrounding said torque rod.

5. In a nuclear reactor according to claim 1 further including means permitting a cooling fluid to pass through said shroud in heat exchange contact with said torque rod and other means within said shroud.

* * * * *